(12) United States Patent
Huang

(10) Patent No.: US 7,994,993 B2
(45) Date of Patent: Aug. 9, 2011

(54) RECEIVING ANTENNA FOR RECEIVING TIRE PRESSURE SIGNAL

(75) Inventor: Shiao-Hwa Huang, Taichung (CN)

(73) Assignee: Mobiletron Electronics Co., Ltd., Taiwan (CN)

( * ) Notice: Subject to any disclaimer, the term of this patent is extended or adjusted under 35 U.S.C. 154(b) by 345 days.

(21) Appl. No.: 12/438,416

(22) PCT Filed: Nov. 22, 2006

(86) PCT No.: PCT/CN2006/003146
§ 371 (c)(1),
(2), (4) Date: Feb. 23, 2009

(87) PCT Pub. No.: WO2008/061393
PCT Pub. Date: May 29, 2008

(65) Prior Publication Data
US 2010/0001911 A1  Jan. 7, 2010

(51) Int. Cl.
*H01Q 1/32* (2006.01)
(52) U.S. Cl. .................................. 343/713; 343/895
(58) Field of Classification Search .................. 343/713, 343/704, 711, 712, 895
See application file for complete search history.

(56) References Cited

U.S. PATENT DOCUMENTS

| | | | |
|---|---|---|---|
| 4,609,905 A * | 9/1986 | Uzzo | 340/447 |
| 6,295,029 B1 * | 9/2001 | Chen et al. | 343/700 MS |
| 6,842,158 B2 * | 1/2005 | Jo et al. | 343/895 |
| 6,977,615 B2 | 12/2005 | Brandwein, Jr. | |
| 7,050,011 B2 * | 5/2006 | Ghabra et al. | 343/711 |
| 7,564,415 B2 * | 7/2009 | Rabinovich et al. | 343/713 |
| 2005/0132791 A1 | 6/2005 | Hayashi | |
| 2006/0170610 A1 * | 8/2006 | Rabinovich et al. | 343/895 |

FOREIGN PATENT DOCUMENTS

| | | |
|---|---|---|
| CN | 2143822 | 10/1993 |
| CN | 1598488 A | 3/2005 |
| WO | 96/37374 A1 | 11/1996 |

* cited by examiner

*Primary Examiner* — Tho G Phan
(74) *Attorney, Agent, or Firm* — Browdy and Neimark, PLLC

(57) ABSTRACT

For installation in the chassis of a car to receive a tire pressure signal from a sensor and transmitter unit wirelessly and to transmit the signal to a display device in the driver's cab of the car through a cable, a receiving antenna for receiving tire pressure signal is disclosed to include a base, a circuit board mounted in the base and spaced the bottom side of the base at a distance over 1 cm, and a top cover covering the base. The circuit board has a metal signal receiving line arranged on the substrate thereof. The signal receiving line has a receiving segment arranged on the top wall of the substrate near one end and extending around a rectangular area of the top wall a number of turns from an inner side toward an outer side, a lead-out segment extending from the outer end of the receiving segment to a predetermined distance in direction toward the other end of the substrate, and a connection segment extended from the lead-out segment to a connection terminal at the second end of the substrate and having a width greater than the lead-out segment.

8 Claims, 4 Drawing Sheets

US 7,994,993 B2

RECEIVING ANTENNA FOR RECEIVING TIRE PRESSURE SIGNAL

BACKGROUND OF THE INVENTION

1. Field of the Invention

The present invention relates to vehicle antennas and more particularly, to a high-performance receiving antenna for receiving tire pressure signal used in a motor vehicle for receiving tire pressure signals.

2. Description of the Related Art

To avoid traffic accidents due to an excessive low tire pressure condition, the National Highway Traffic Safety Administration (NHTSA) has issued its final rule requiring all new passenger cars and light vehicles being manufactured for sale in the U.S. to be equipped with tire pressure monitoring systems (TPMS) by September 2007.

A known tire pressure monitoring system generally includes a sensor and transmitter unit installed in each of the vehicle tires, and a display device installed in the driver's cab. The sensor and transmitter unit detects the pressure of each of the vehicle tires and transmits each detected tire pressure signal to a wireless receiver at the display device in the driver's cab wirelessly, for display on the display screen of the display device in the form of a symbol or words. Subject to the symbol or words display on the display screen, the driver knows whether or not the tire pressure status of each of the wheels of the motor vehicle is under the normal range.

According to the aforesaid prior art design, the sensor and transmitter unit of the tire pressure monitoring system transmits the detected tire pressure signal to the wireless receiver at the display device in the driver's cab wirelessly during rotation of the wheels of the motor vehicle. The transmitting tire pressure signal will be attenuated due to continuous rotation of the wheels of the motor vehicle. Further, because the tire pressure signal is being transmitted from the sensor and transmitter unit at the wheels of the motor vehicle to the wireless receiver at the display device in the driver's cab, the long distance transmitting of the tire pressure signal cannot avoid signal attenuation, and the wireless receiver at the display device may be unable to receive the tire pressure signal accurately.

SUMMARY OF THE INVENTION

The present invention has been accomplished under the circumstances in view. It is the main object of the present invention to provide a receiving antenna for receiving tire pressure signal, which accurately receives each tire pressure signal transmitted from a sensor and transmitter unit that is installed in each wheel of a motor vehicle and transmits each received tire pressure signal to a display device in the driver's cab of the motor vehicle.

To achieve this and other objects of the present invention, a receiving antenna for receiving tire pressure signal for mounting on the chassis of a motor vehicle to receive a tire pressure signal from a sensor and transmitter unit and to transmit the signal to a display device in the driver's cab of the motor vehicle comprises a base, a circuit board, and a top cover. The circuit board comprises a substrate and a signal receiving line. The substrate is fixedly mounted in the base and spaced above the bottom side of the base at a distance greater than 1 cm. The substrate comprises a top wall having a first end and a second end opposite to the first end. The signal receiving line is formed of a metal material and arranged on the top wall of the substrate. The signal receiving line comprises a receiving segment, a lead-out segment and a connection segment. The receiving segment is arranged on the top wall of the substrate near the first end and extending around a rectangular area of the top wall a number of turns from an inner side toward an outer side. The lead-out segment extends from the outer end of the receiving segment to a predetermined distance in direction toward the second end of the substrate. The connection segment extends from one end of the lead-out segment opposite to the receiving segment to the second end of the substrate. The lead-out segment has a width smaller than the connection segment. The top cover is covered on the base to seal the circuit board in between the base and the top cover.

Figure 1:
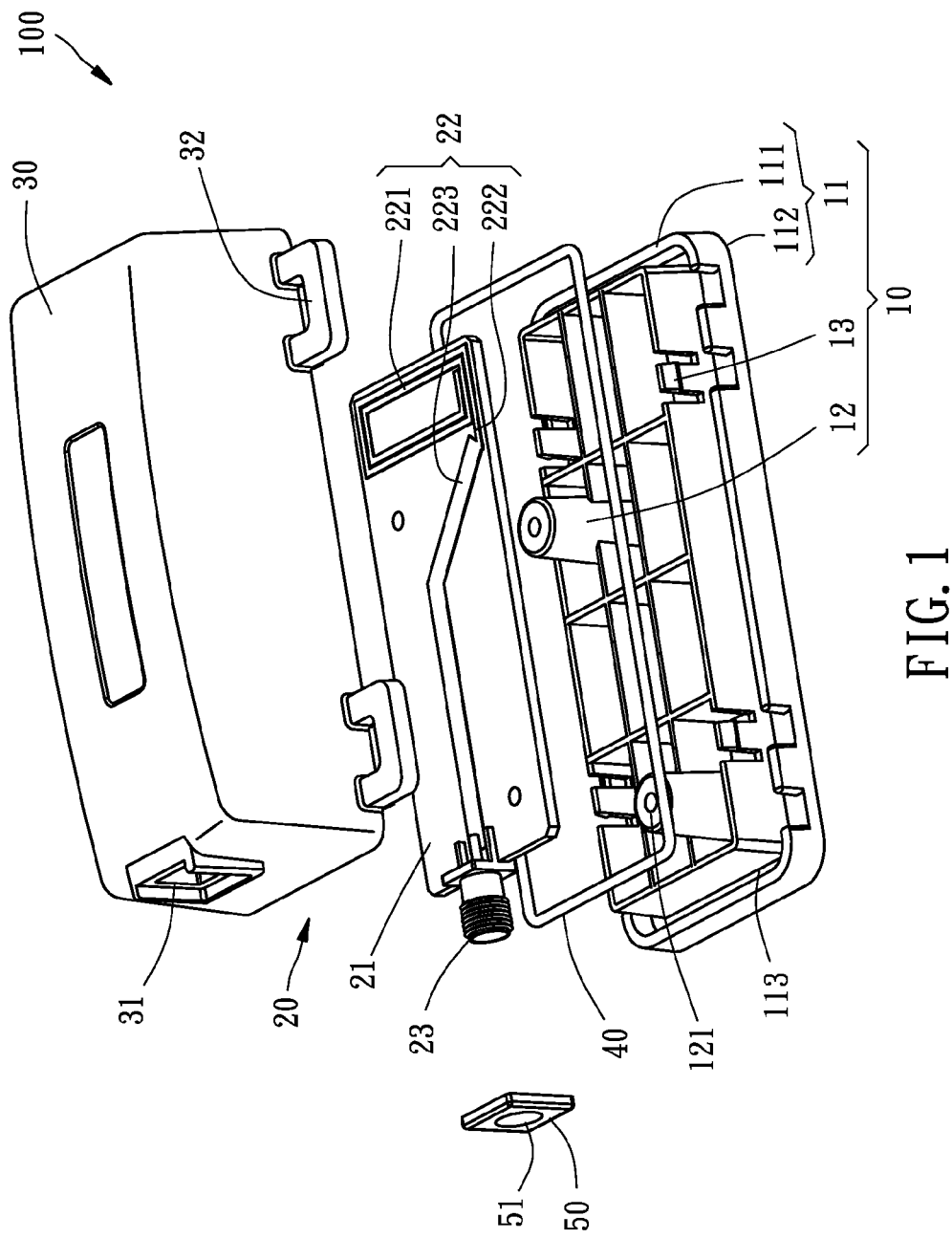
FIG. 1 is an exploded view of a receiving antenna for receiving tire pressure signal in accordance with the present invention.

BRIEF DESCRIPTION OF THE NUMERALS USED IN THE DRAWINGS receiving antenna for receiving tire pressure signal 100

| | |
|---|---|
| base 10 | bottom panel 11 |
| top side 111 | bottom side 112 |
| endless groove 113 | column 12 |
| mounting screw hole 121 | first coupling device 13 |
| circuit board 20 | substrate 21 |
| receiving line 22 | receiving segment 221 |
| lead-out segment 222 | connection segment 223 |
| connection terminal 23 | top cover 30 |
| opening 31 | eye lugs 32 |
| packing ring 40 | gasket 50 |
| through hole 51 | car 90 |
| chassis 91 | display device 92 |
| cable 93 | |

DETAILED DESCRIPTION OF THE INVENTION

Figure 2:
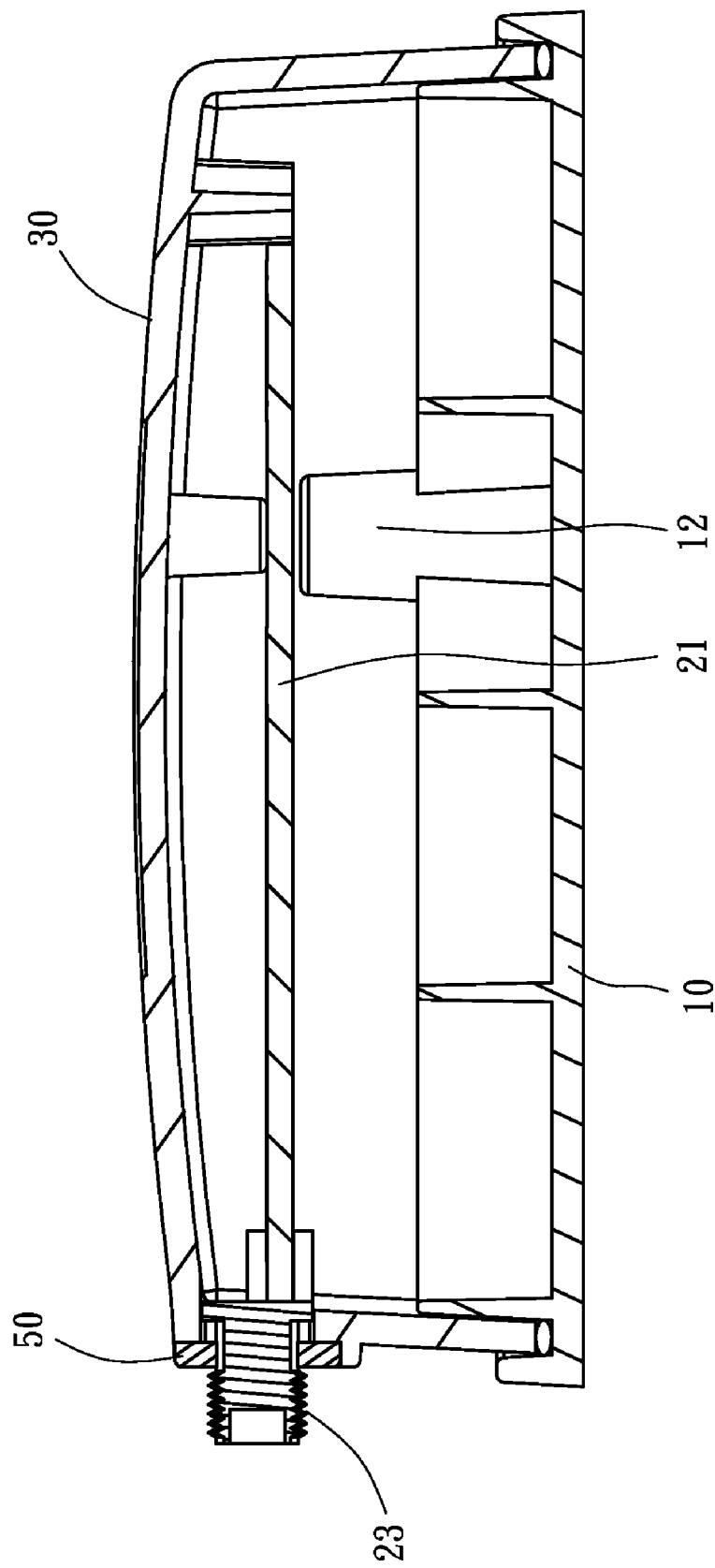
FIG. 2 is a sectional assembly view of the receiving antenna for receiving tire pressure signal in accordance with the present invention.
Figure 3:
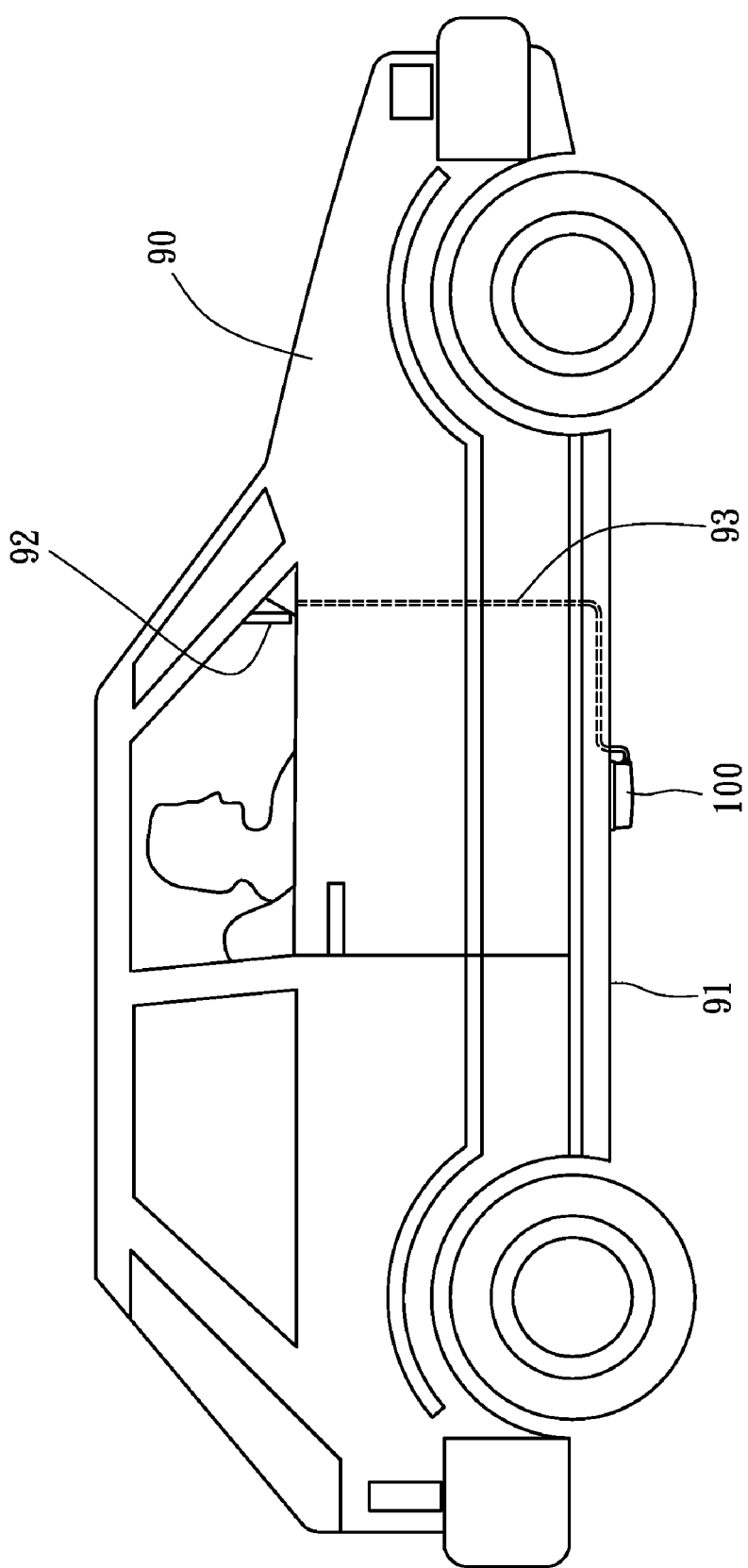
FIG. 3 is a schematic drawing showing an application example of the present invention.

Referring to FIGS. 1~3, a receiving antenna for receiving tire pressure signal 100 is shown installed in the chassis of a car, comprising a base 10, a circuit board 20, a top cover 30, a packing ring 40, and a gasket 50.

The base 10 comprises a bottom panel 11, two columns 12, and a plurality of first coupling devices 13. The bottom panel 11 has a top side 111, and a bottom side 112 opposite to the top side 111. The top side 111 defines therein an endless groove 113. The two columns 12 have a predetermined length (greater than 1 cm). Each column 12 has a bottom end thereof connected to the top side 111 of the bottom panel 11, and a top end therefore provided with a mounting screw hole 121. Each first coupling device 13 is a hook block formed integral with the periphery of the bottom panel 11.

The circuit board 20 comprises a substrate 21, a signal receiving line 22, and a connection terminal 23. The signal receiving line 22 is formed of a metal material, having a receiving segment 221, a lead-out segment 222 and a connection segment 223. The receiving segment 221 is arranged on the top wall of the substrate 21 near one end thereof and extending around a rectangular area a number of turns from an inner side toward an outer side. The lead-out segment 222 extends from the outer end of the receiving segment 221 to a predetermined distance in direction toward the other end of the top wall of the substrate 21. The connection segment 223 extends from the free end of the lead-out segment 222 to the other end of the top wall of the substrate 21. The width of the lead-out segment 222 is smaller than the width of the connection segment 223. The connection terminal 23 is installed in the end of the substrate 21 remote from the receiving segment 221, and electrically connected with the connection segment 223.

The top cover 30 defines therein an inside accommodation space, having an opening 31 in communication between the inside accommodation space and the atmosphere, a plurality of second coupling devices (not shown) located on the inside wall thereof corresponding to the first coupling devices 13 of the base 10, and a plurality of eye lugs 32 protruded from the peripheral wall for mounting. These second coupling devices are hook holes for engagement with the hook blocks 13 of the base 10.

The packing ring 40 is an endless elastic cord member.

The gasket 50 is an elastic pad having a through hole 51.

After understanding of the structural details of the component parts of the receiving antenna for receiving tire pressure signal, the installation and operation of the receiving antenna for receiving tire pressure signal are outlined hereinafter.

At first, set the packing ring 40 in the endless groove 113 at the top side 111 of the base 10, and then attach the bottom side of the circuit board 20 to the topmost edges of the columns 12 and affix the circuit board 20 to the mounting screw hole 121 of the columns 12 with screws (not shown). Thus, the circuit board 20 is spaced above the top side 111 of the base 10 at a distance greater than 1 cm. Thereafter, press the top cover 30 on the packing ring 40 in the endless groove 113 of the base 10 to force the second coupling devices into engagement with the first coupling devices 13. At this time, the top cover 30 closes the top side of the base 10, the circuit board 20 is accommodated in the inside accommodation space of the top cover 30, and the connection terminal 23 of the circuit board 20 extends to the outside of the top cover 30 through the opening 31. Thereafter, affix the gasket 50 to the opening 31 of the top cover 30 to let the connection terminal 23 pass through the through hole 51 thereof to seal the gap between the connection terminal 23 and the top cover 30. Thus, the receiving antenna for receiving tire pressure signal 100 is assembled.

When using the receiving antenna for receiving tire pressure signal 100, attach the bottom side 112 of the base 10 to the chassis 91 of the car 90, and then insert a binding strap (not shown) through the eye lugs 32 of the top cover 30 to fasten the receiving antenna for receiving tire pressure signal 100 to the chassis 91 of the car 90, and then connect one end of a cable 93 to the connection terminal 23, and then connect the other end of the cable 93 to a display device 92 in the driver's cab of the car 90, as shown in FIG. 3. Thus, when the sensor and transmitter unit that is installed in the tire of each wheel of the car 90 transmits a tire pressure signal, the receiving segment 221 of the signal receiving line 22 of the circuit board 20 of the receiving antenna for receiving tire pressure signal 100 at the chassis 91 of the car 90 receives the signal wirelessly and then transfers the signal in proper order through the lead-out segment 222, the connection segment 223, the connection terminal 23 and the cable 93 to the display device 92 for display on the display screen of the display device 92.

Because the receiving antenna for receiving tire pressure signal 100 is mounted on the chassis 91 of the car 90, the signal transmitted by the sensor and transmitter unit can be received by the receiving antenna for receiving tire pressure signal 100 within a short distance, avoiding signal attenuation and assuring signal receiving accuracy.

Further, because the circuit board 20 is supported on the columns 12 above the top side 111 of the bottom panel 11 of the base 10 at a predetermined distance (over 1 cm), the circuit board 20 can receive and transmit signal effectively, avoiding interference by the chassis 91 of the car 90. Therefore, the invention eliminates signal distortion.

Further, because the receiving segment 221 of the signal receiving line 22 of the circuit board 20 is arranged on the top wall of the substrate 21 and extending around a rectangular area a number of turns from an inner side toward an outer side, an excellent resonance effect can be produced, enhancing signal receiving accuracy.

Further, because the width of the lead-out segment 222 is smaller than the width of the connection segment 223, interference between the receiving segment 221 and the connection segment 223 is reduced, assuring receiving accuracy.

Figure 4:
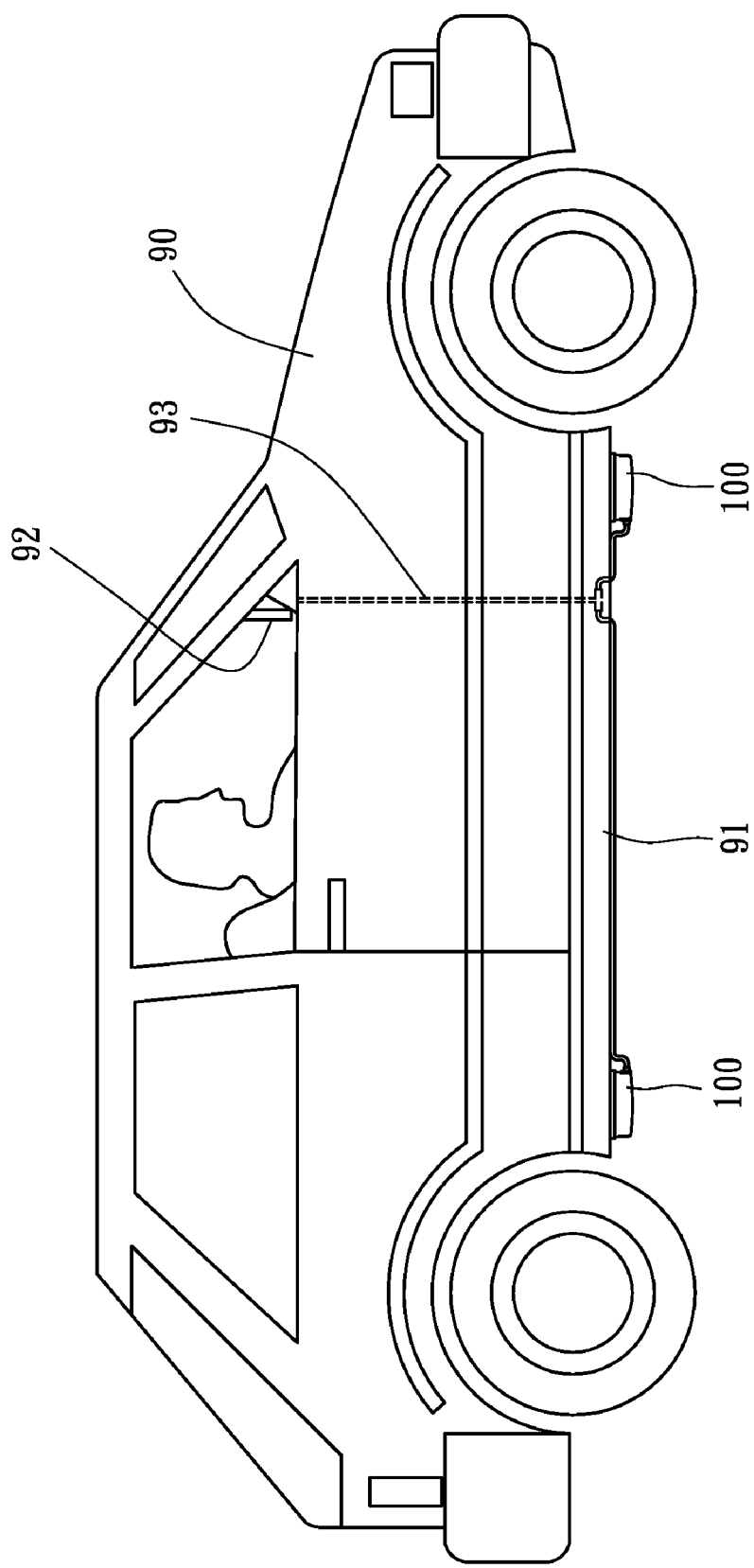
FIG. 4 is a schematic drawing showing another application example of the present invention.

Referring to FIG. 4, two receiving antennas for receiving tire pressure signal 100 can be used and mounted on the chassis 92 of the car 90 with one disposed near the front wheels and the other near the rear wheels. The two receiving antennas for receiving tire pressure signal 100 are respectively electrically connected to the display device 92 in the driver's cab by a respective cable 93. Thus, the receiving antenna for receiving tire pressure signal 100 that is disposed near the front wheels can receive the tire pressure signal from each front wheel, and the receiving antenna for receiving tire pressure signal 100 that is disposed near the rear wheels can receive the tire pressure signal from each rear wheel.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A receiving antenna for receiving tire pressure signal mounted on the chassis of a motor vehicle, comprising:

a base;

a circuit board, said circuit board comprising a substrate and a signal receiving line, said substrate being fixedly mounted in said base and spaced above a bottom side of said base at a distance greater than 1 cm, said substrate comprising a top wall having a first end and a second end opposite to said first end, said signal receiving line being formed of a metal material and arranged on the top wall of said substrate, said signal receiving line comprising a receiving segment, a lead-out segment and a connection segment, said receiving segment being arranged on the top wall of said substrate near said first end and extending around a rectangular area of said top wall a number of turns from an inner side toward an outer side, said lead-out segment extending from an outer end of said receiving segment to a predetermined distance in direction toward said second end of said substrate, said connection segment extending from one end of said lead-out segment opposite to said receiving segment to the second end of said substrate, said lead-out segment having a width smaller than said connection segment; and a top cover covered on said base to seal said circuit board in between said base and said top cover.

2. The receiving antenna for receiving tire pressure signal as claimed in claim 1, wherein said base comprises a bottom panel and at least one column, said bottom panel defining a top side and a bottom side opposite to the top side, each said column having a bottom side thereof fixedly connected to the top side of said bottom panel; said circuit board is affixed to a top side of each said column by a respective screw and spaced above the bottom side of said bottom panel at a distance greater than 1 cmm.

3. The receiving antenna for receiving tire pressure signal as claimed in claim 1, wherein said base comprises at least one first coupling device; said top cover comprises at least one second coupling device respectively fastened to the at least one first coupling device of said base.

4. The receiving antenna for receiving tire pressure signal as claimed in claim 1, further comprising a packing ring mounted in an endless groove around the border of said base and stopped between said base and said top cover to seal the gap between said base and said top cover.

5. The receiving antenna for receiving tire pressure signal as claimed in claim 1, wherein said circuit board further comprises a connection terminal extended from the second end of the top wall of said substrate and electrically connected with said connection segment of said signal receiving line for the connection of an external cable for signal output.

6. The receiving antenna for receiving tire pressure signal as claimed in claim 5, wherein said top cover comprises an opening for the passing of said connection terminal from said circuit board to the outside of said top cover.

7. The receiving antenna for receiving tire pressure signal as claimed in claim 6, further comprising a gasket mounted in said opening of said top cover around said connection terminal to seal the gap between said connection terminal and said top cover.

8. The receiving antenna for receiving tire pressure signal as claimed in claim 1, wherein said top cover comprises at least one eye lug for the insertion of a binding strap to secure the receiving antenna for receiving tire pressure signal to the chassis of a motor vehicle.

\* \* \* \* \*